United States Patent
Choi et al.

(10) Patent No.: US 11,597,675 B2
(45) Date of Patent: Mar. 7, 2023

(54) LOW TEMPERATURE-CALCINED LEAD-FREE GLASS FRIT AND PASTE, AND VACUUM GLASS ASSEMBLY USING SAME

(71) Applicant: LG ELECTRONICS INC., Seoul (KR)

(72) Inventors: Wongyu Choi, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 17/291,958

(22) PCT Filed: Nov. 8, 2019

(86) PCT No.: PCT/KR2019/015136
§ 371 (c)(1),
(2) Date: May 6, 2021

(87) PCT Pub. No.: WO2020/096402
PCT Pub. Date: May 14, 2020

(65) Prior Publication Data
US 2022/0002188 A1     Jan. 6, 2022

(30) Foreign Application Priority Data
Nov. 9, 2018 (KR) .................. 10-2018-0137476

(51) Int. Cl.
*C03C 8/04* (2006.01)
*C03C 8/16* (2006.01)
*C03C 8/24* (2006.01)

(52) U.S. Cl.
CPC .................. *C03C 8/04* (2013.01); *C03C 8/16* (2013.01); *C03C 8/24* (2013.01)

(58) Field of Classification Search
CPC ................ C03C 8/04; C03C 8/16; C03C 8/24
See application file for complete search history.

(56) References Cited

U.S. PATENT DOCUMENTS

| | | |
|---|---|---|
| 2008/0164462 A1 | 7/2008 | Lee et al. |
| 2010/0180934 A1 | 7/2010 | Naito et al. |
| 2011/0073880 A1 | 3/2011 | Lee et al. |
| 2011/0126976 A1 | 6/2011 | Kikutani et al. |
| 2012/0056523 A1 | 3/2012 | Han et al. |
| 2012/0213951 A1 | 8/2012 | Dennis |
| 2012/0213952 A1 | 8/2012 | Dennis |
| 2012/0321902 A1 | 12/2012 | Kohara et al. |
| 2013/0305786 A1 | 11/2013 | Kikutani et al. |
| 2013/0333748 A1 | 12/2013 | Naito et al. |
| 2014/0145122 A1 | 5/2014 | Sawai et al. |
| 2014/0326393 A1 | 11/2014 | Dennis |
| 2016/0257610 A1 | 9/2016 | Kodama et al. |
| 2018/0022639 A1 | 1/2018 | Dennis |
| 2019/0152839 A1 | 5/2019 | Dennis |

FOREIGN PATENT DOCUMENTS

| | | |
|---|---|---|
| CN | 101215094 A | 7/2008 |
| CN | 102918927 A | 2/2013 |
| CN | 103492334 A | 1/2014 |
| CN | 103648999 A | 3/2014 |
| CN | 105683111 A | 6/2016 |
| EP | 2308806 A1 | 4/2011 |
| EP | 2525626 A1 | 11/2012 |
| JP | 08259262 A | 10/1996 |
| JP | 2012106891 A | 6/2012 |
| JP | 2015137186 A | 7/2015 |
| JP | 6027171 B2 | 11/2016 |
| KR | 10-0787463 B1 | 12/2007 |
| KR | 10-0899447 B1 | 5/2009 |
| KR | 10-2012-0023898 A | 3/2012 |
| KR | 10-2013-0025362 A | 3/2013 |
| KR | 10-2014-0125780 A | 10/2014 |
| KR | 1020170011866 A | 2/2017 |
| WO | 2014102921 A1 | 7/2014 |

Primary Examiner — Karl E Group
(74) Attorney, Agent, or Firm — Dentons US LLP

(57) ABSTRACT

The present disclosure relates to a low temperature-calcined lead-free glass frit and paste, and a vacuum glass assembly using the same. The glass frit according to the present disclosure has a novel component system comprising $V_2O_5$, $TeO_2$, CuO, BaO, one or more of $Ag_2O$ and $Bi_2O_3$, ZnO, and one or more of SnO and $MoO_3$ at a characteristic composition ratio according to the disclosure, whereby the glass frit can replace a lead-based glass composition of the related art, can be calcined at a low temperature of 350° C. or lower and can ensure excellent chemical durability.

19 Claims, No Drawings

LOW TEMPERATURE-CALCINED LEAD-FREE GLASS FRIT AND PASTE, AND VACUUM GLASS ASSEMBLY USING SAME

CROSS-REFERENCE TO RELATED APPLICATION

This application is the National Stage filing under 35 U.S.C. 371 of International Application No. PCT/KR2019/015136, filed on Nov. 8, 2019, which claims priority to and the benefit of Korean Patent Application No. 10-2018-0137476, filed on Nov. 9, 2019, which is incorporated herein by reference in its entirety.

TECHNICAL FIELD

Disclosed herein is a low temperature-calcined lead-free glass frit and paste, and a vacuum glass assembly using the same.

BACKGROUND

Glass windows or home appliances or electric and electronic parts such as a multi-layer vacuum insulated glass panel, a display panel, an organic EL display panel and the like are sealed or attached by a glass frit including a glass composition and inorganic ceramic particles. The glass frit for sealing is usually applied in the form of paste, and the glass paste is applied onto glass using a screen printing method or a dispensing method and the like, is dried and then is calcined, to have a sealing function.

A PbO—$B_2O_3$-based glass composition including a large amount of lead oxide has been widely used. The APbO—$B_2O_3$-based glass composition has a softening point ranging from 400 to 450° C. Accordingly, the APbO—$B_2O_3$-based glass composition shows good fluidity and softening and has relatively high chemical reliability.

At a time when the environment is top priority across the world, the demand for environmentally friendly materials grows. For example, Directive of Restriction of Hazardous Substances (RoHS) in Electrical and Electronic Equipment came into force in Jul. 1, 2006 in European countries. Under the directive, the use of a total of six materials including lead is banned.

The PbO—$B_2O_3$-based glass composition includes large amounts of lead that is banned in accordance with the RoHS Directive. Accordingly, the glass composition cannot be used for glass paste for sealing. Under the circumstances, there is a growing need for a novel glass composition including no lead. Additionally, the demand for a lead-free glass composition that replaces the PbO—$B_2O_3$-based glass composition, ensures low temperature fluidity and low temperature softening and has chemical reliability grows to reduce thermal degradation of various types of glass sealed parts or glass sealed electric and electronic parts and to improve productivity.

An $Ag_2O$—$V_2O_5$—$TeO_2$-based lead-free glass composition is widely known as the lead-free glass composition that includes no lead and is calcined at low temperature.

The $Ag_2O$—$V_2O_5$—$TeO_2$-based glass composition of the related art is highly likely to crystallize during a calcination process. Accordingly, the $Ag_2O$—$V_2O_5$—$TeO_2$-based glass composition cannot ensure fluidity and softening to a sufficient degree.

When the $Ag_2O$—$V_2O_5$—$TeO_2$-based lead-free glass composition of the related art is applied to tempered glass used for a home appliance and the like, a thermal expansion coefficient of the lead-free glass composition of the related art does match a thermal expansion coefficient of the tempered glass. Accordingly, the $Ag_2O$—$V_2O_5$—$TeO_2$-based lead-free glass composition can hardly be calcined at low temperature, and reinforcement of the tempered glass can be undone.

Additionally, since the $Ag_2O$—$V_2O_5$—$TeO_2$-based lead-free glass composition of the related art includes no Pb, the lead-free glass composition cannot ensure durability and can easily react with moisture.

SUMMARY

Technical Problem

The present disclosure is directed to a novel low temperature-calcined lead-free glass frit that may be calcined at lower temperature, as a lead-free glass composition replacing a lead-based glass composition of the related art.

The present disclosure is also directed to a novel low temperature-calcined lead-free glass frit that may be calcined at low temperature and may have a composition ratio at which a crystallization tendency is reduced even during low temperature calcination.

The present disclosure is also directed to a novel low temperature-calcined lead-free glass frit that may ensure excellent chemical durability such as durability against moisture and the like.

Technical Solution

To provide a novel glass frit that may be calcined at low temperature as a lead-free glass composition replacing a lead-based glass composition of the related art, the glass frit according to the present disclosure may include 15-35 wt % of vanadium oxide ($V_2O_5$), 30-50 wt % of tellurium dioxide ($TeO_2$), 1-5 wt % of copper oxide (CuO), 1-5 wt % of barium oxide (BaO), 10-30 wt % of one or more of silver oxide ($Ag_2O$) and bismuth oxide ($Bi_2O_3$), 1-10 wt % of zinc oxide (ZnO), and 5-30 wt % of one or more of tin oxide (SnO) and molybdenum trioxide ($MoO_3$).

Additionally, to provide a glass frit that may be calcined at low temperature and may ensure a low crystallization tendency even during low temperature calcination, the glass frit according to the present disclosure may satisfy an equation of a relationship between $V_2O_5$ content and $TeO_2$ content, described below.

$$V_2O_5 \text{ (wt \%)}/TeO_2 \text{ (wt \%)} \leq 1 \quad \text{[Relationship equation]}$$

Further, to provide a glass frit that may be calcined at low temperature and ensure excellent chemical durability, specifically, rarely react with moisture, the glass frit according to the present disclosure may include 2-7 wt % of ZnO, for example.

Advantageous Effect

A glass frit according to the present disclosure may have a novel composition system in which $V_2O_5$, $TeO_2$, CuO, BaO, one or more of $Ag_2O$ and $Bi_2O_3$, ZnO, and one or more of SnO and $MoO_3$ are included at a unique composition ratio according to the disclosure, thereby replacing a lead-based glass composition of the related art and being calcined at low temperature of 350° C. or less.

Additionally, the glass frit according to the present disclosure may include $V_2O_5$ and $TeO_2$ at an optimal ratio, thereby being calcined at low temperature and ensuring a low crystallization tendency even during low temperature calcination.

Further, the glass frit according to the present disclosure may include 2-7 wt % of ZnO, for example, thereby being calcined at low temperature and ensuring excellent chemical durability.

DETAILED DESCRIPTION

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described.

Embodiments can be implemented in various different forms, and should not be construed as being limited only to the embodiments set forth herein. Rather, the embodiments in the disclosure are provided as examples so that the present disclosure will be thorough and complete and will fully convey the scope of the disclosure to one having ordinary skill in the art to which the present disclosure pertains.

A low temperature-calcined lead-free glass frit and paste, and a vacuum glass assembly using the same according to the present disclosure are described hereunder.

Low Temperature-Calcined Lead-Free Glass Frit

When temperatures on physical properties such as a glass transition point and a softening point of a glass frit used as a sealing material are low, low temperature fluidity may improve. However, when the temperatures on physical properties are too low, a crystallization tendency may increase, thereby deteriorating the low temperature fluidity.

Additionally, when tempered glass used for home appliances is exposed to a sealing process at high temperature, reinforcement of the tempered glass may be undone. To prevent this from happening, the sealing process needs to be performed in a range of low temperatures (350° C. or less). Accordingly, a glass frit sealing material used in the sealing process has to be able to be calcined at low temperature and has to ensure fluidity and softening to a proper degree. Further, unlike a Pb-based sealing material, a $V_2O_5$-based glass frit sealing material including no Pb is highly likely to react with moisture and has poor chemical durability, thereby deteriorating reliability of the sealing material.

To solve the problem, a novel glass frit, which may be calcined at low temperature, may ensure a low crystallization tendency, proper fluidity and excellent chemical durability and may be applied in a sealing process of tempered glass, was manufactured.

The glass frit according to the disclosure may include 15-35 wt % of vanadium oxide ($V_2O_5$), 30-50 wt % of tellurium dioxide ($TeO_2$), 1-5 wt % of copper oxide (CuO), 1-5 wt % of barium oxide (BaO), 10-30 wt % of one or more of silver oxide ($Ag_2O$) and bismuth oxide ($Bi_2O_3$), 1-10 wt % of zinc oxide (ZnO), and 5-30 wt % of one or more of tin oxide (SnO) and molybdenum trioxide ($MoO_3$).

The component $V_2O_5$ may improve durability of the glass frit and lower a softening point, and 15-35 wt % of $V_2O_5$ may be included in the glass frit. When greater than 35 wt % of $V_2O_5$ is included, it may be difficult to calcine the glass frit. When less than 15 wt % of $V_2O_5$ is included, an effect of lowering the softening point of the glass frit may not be sufficiently produced. Additionally, the durability of the glass frit may deteriorate.

The component $TeO_2$ may improve fluidity of the glass frit, and 30-50 wt % of $TeO_2$ may be included in the glass frit. When greater than 50 wt % of $TeO_2$ is included, the softening point of the glass frit may not be sufficiently lowered, and the glass frit may hardly be calcined. When less than 30 wt % of $TeO_2$ is included, it may be difficult to vitrify the glass frit depending on a balance between $TeO_2$ another component.

The component CuO may help to ensure a thermal expansion coefficient required by the glass frit and to meet durability requirements of the glass frit, and 1-5 wt % of CuO may be included in the glass frit. When greater than 5 wt % of CuO is included, the fluidity of the glass frit may deteriorate. When less than 1 wt % of CuO is included, the thermal expansion coefficient required by the glass frit may not be ensured.

The component BaO may help to ensure the thermal expansion coefficient required by the glass frit and to meet the durability requirements of the glass frit, and 1-5 wt % of BaO may be included in the glass frit. When greater than 5 wt % of BaO is included, the fluidity of the glass frit may deteriorate. When less than 1 wt % of BaO is included, the thermal expansion coefficient required by the glass frit may not be ensured.

The components of $Ag_2O$ and $Bi_2O_3$ may improve the durability of the glass frit and reduce a crystallization tendency of the glass frit. The glass frit according to the disclosure may include 10-30 wt % of one or more of $Ag_2O$ and $Bi_2O_3$. When greater than 30 wt % of one or more of $Ag_2O$ and $Bi_2O_3$ is included, the thermal expansion coefficient may drop, but sealing performance may deteriorate. When less than 10 wt % of one or more of $Ag_2O$ and $Bi_2O_3$ is included, it is difficult to match thermal expansion coefficients and to calcine the glass frit at low temperature.

The glass frit according to the present disclosure may include 1-10 wt % of ZnO, and 5-30 wt % of one or more of SnO and $MoO_3$ to ensure proper fluidity and to improve chemical durability. When greater than 10 wt % of ZnO and greater than 30 wt % of one or more of SnO and $MoO_3$ are included, the thermal expansion coefficient required by the glass frit may hardly be ensured and the fluidity may hardly be ensured. When less than 1 wt % of ZnO and less than 1 wt % of one or more of SnO and $MoO_3$ are included, the thermal expansion coefficient required by the glass frit may barely be ensured and the chemical durability required by the glass frit may barely be ensured. For example, the glass frit according to the disclosure may include 2-7 wt % of ZnO. The glass frit according to the disclosure may include 2-7 wt % of ZnO, and accordingly, may include other components in a proper content range, to improve physical properties such as chemical durability and reliability.

Additionally, the glass frit according to the disclosure may further include an inorganic filler, when necessary. The inorganic filler may help to reduce the thermal expansion coefficient of the glass frit, and 5-30 wt % of the inorganic filler may be included in the glass frit. When greater than 30 wt % of the inorganic filler is included, the sealing performance of the glass frit may deteriorate, and a water-resistant property of the glass frit may deteriorate. When less than 5 wt % of the inorganic filler is included, it is difficult to ensure the thermal expansion coefficient required by the glass frit and to calcine the glass frit at low temperature.

The inorganic filler according to the disclosure may include crystalloid inorganic particles having a low thermal expansion coefficient. Specifically, the inorganic filler may include one or more of zirconium phosphate, zirconium phosphate tungstate, zirconium, $Li_2O$—$Al_2O_3$—$SiO_2$, β-eucryptite, and zirconium tungstate.

In the aspect of the reliability in calcination associated with the crystallization tendency, the components $V_2O_5$ and $TeO_2$ may be included in the glass frit according to the disclosure to the degree that a relationship equation below is satisfied.

$$V_2O_5 \text{ (wt \%)}/TeO_2 \text{ (wt \%)} \leq 1 \quad \text{[Relationship equation]}$$

As a greater amount of $V_2O_5$ is included, a glass transition point of the glass frit may decrease, and a temperature at which sealing is possible may decrease. However, the crystallization tendency of the glass frit may increase. Accordingly, an optimal ratio of $V_2O_5$ to $TeO_2$ needs to be ensured in a relationship between $V_2O_5$ and $TeO_2$. For example, for the glass frit according to the disclosure, the ratio of $V_2O_5$ (wt %) to $TeO_2$ (wt %) may be 1 or less.

Additionally, the glass frit according to the disclosure may have the thermal expansion coefficient of $70\text{-}140 \times 10^{-7}/°C$. such that the thermal expansion coefficient of the glass frit matches a thermal expansion coefficient of a tempered-glass base material. When the glass frit according to the disclosure includes the inorganic filler, the thermal expansion coefficient of the glass frit may be included in a range of $70\text{-}90 \times 10^{-7}/°C$. The glass frit according to the disclosure may have the thermal expansion coefficient of $70\text{-}1400 \times 10^{-7}/°C$., thereby ensuring an excellent adhesive force to a base material and ensuring improve reliability in the sealing performance Glass Frit Paste Glass frit paste according to the present disclosure may include 100 wt % of the glass frit described above, and 10-100 wt % of an organic vehicle with respect to 100 wt % of the glass frit.

When less than 20 wt % or greater than 100 wt % of the organic vehicle is included, viscosity of the paste may be too high or too low, making it difficult to apply the paste.

The organic vehicle may include an organic solvent and an organic binder. A solvent such as α-terpineol or butly carbitol may be used as the organic solvent, and ethyl cellulose may be used as the organic binder, but not limited.

Vacuum Glass Assembly

The vacuum glass assembly may include two or more glass base materials, and may denote an assembly in which a vacuum is maintained between the two or more glass base materials. The vacuum glass assembly may be used for electronic parts of electronic devices or home appliances such as a refrigerator, a microwave oven and a washing machine.

The glass frit according to the present disclosure may be used as a sealing material for the vacuum glass assembly.

For example, the glass frit according to the disclosure may be used for a vacuum glass assembly to which tempered glass is applied.

When the vacuum glass assembly, to which tempered glass is applied, is exposed to a high-temperature heat treatment process such as a sealing process, reinforcement of the tempered glass may be undone. Thus, the vacuum glass assembly to which tempered glass is applied may not be thermally processed at high temperature.

However, when the glass frit paste according to the disclosure is applied as a sealing material, a sealing process may be performed at a low temperature of less than 350° C. Accordingly, when the glass frit paste according to the disclosure is applied as a sealing material, reinforcement of tempered glass applied to a vacuum glass assembly may not be undone.

The vacuum glass assembly according to the present disclosure may include a first glass base material, a second glass base material spaced from the first glass base material to face the first glass base material, and a sealing material arranged along an edge of the first or second glass base material, boding the first and second glass base materials and sealing a space between the first glass and the second glass, wherein the sealing material may be formed as a result of application and calcination of the paste.

The first glass base material and the second glass base material according to the disclosure may be selected according to the needs of an item to which the vacuum glass assembly is applied. For example, for an item to which tempered glass needs to be applied, tempered glass may be selected for the first glass base material and the second glass base material, and for an item to which ordinary glass needs to be applied, ordinary glass may be selected for the first glass base material and the second glass base material.

As described above, the sealing material according to the disclosure may be calcined at low temperature such that the sealing material is applied to tempered glass. Accordingly, the first glass base material and the second glass base material may be tempered glass, for example.

Additionally, the glass frit paste described above may be used for the sealing material.

Aspects in the disclosure are specifically described hereunder with reference to embodiments.

EMBODIMENT

Manufacturing of Glass Frit

A glass frit having a composition ratio shown in table 1 below was manufactured. A raw material of each component was sufficiently mixed for three hours in a V-mixer. Herein, barium carbonate ($BaCO_3$) was used as a raw material for BaO, and ammonium dihydrogen phosphate ($NH_4H_2PO_4$) was used as a raw material for $P_2O_5$. The remaining components used to manufacture the glass frit are listed in table 1. The mixed materials were melted sufficiently at 800-1000° C. for one hour and were rapidly cooled in a quenching roller to obtain a glass cullet.

An initial grain size of the glass cullet obtained through the above process was controlled using a ball mill and then was ground for about one hour using a jet mill, and then glass power was allowed to pass through a 325 mesh sieve (ASTM C285-88) to control a grain size of the glass powder, such that less than 1 g of the glass powder was left.

In embodiments 1 to 3, the glass cullet was only used to manufacture the glass frit, and in embodiments 4 and 5, the glass cullet mixed with an inorganic filler was used to manufacture the glass frit.

TABLE 1

| Component | Embodiment | | | | | Comparative example | |
|---|---|---|---|---|---|---|---|
| (wt %) | 1 | 2 | 3 | 4 | 5 | 1 | 2 |
| $V_2O_5$ | 25 | 30 | 35 | 15 | 17 | 24 | 53 |
| CuO | 2 | 3 | 1 | 3 | 3 | 59 | 37 |
| ZnO | 3 | 3 | 4 | 3 | 3 | — | — |
| $MoO_3$ | 15 | — | 2 | — | 3 | — | — |
| SnO | 3 | 8 | 10 | 7 | 5 | — | — |
| BaO | 1 | 2 | 3 | 2 | 2 | — | — |

TABLE 1-continued

| Component | Embodiment | | | | | Comparative example | |
|---|---|---|---|---|---|---|---|
| (wt %) | 1 | 2 | 3 | 4 | 5 | 1 | 2 |
| $Bi_2O_3$ | 7 | 3 | 5 | 6 | 6 | — | — |
| $TeO_2$ | 40 | 44 | 35 | 35 | 33 | — | — |
| $Ag_2O$ | 4 | 7 | 5 | 14 | 13 | 12 | 6 |
| Filler (Zirconium phosphate) | — | — | — | 15 | 15 | 5 | 4 |

Manufacturing of Paste

To manufacture an organic vehicle, α-terpineol and ethyl cellulose were mixed at a proper ratio. Then the mixture was mixed with the glass frit manufactured as described above at a proper ratio to manufacture the paste. For a uniform mix, a three roll mill was used.

Manufacturing of Vacuum Glass Assembly Sample

Two pieces of tempered glass were prepared, and the paste according to embodiments 1 to 5 and comparative examples 1 and 2 was applied to an outer part of each tempered glass to manufacture a total of seven glass assembly samples. An evacuation process and a sealing process were performed at 350° C. for the glass assemblies. Thus, a total of seven glass assembly samples was manufactured.

Experimental Example

Properties of the glass frits, the paste and the samples manufactured in the embodiments and the comparative examples were measured, and results of the measurement were listed in table 2 below.

1. Glass Transition Temperature (Tg)

A glass transition point was measured at a heating rate of 10° C./min using a TMA instrument (TMA-Q400 TA instrument).

2. Thermal Expansion Coefficient (CTE($\times 10^{-7}$/° C.))

A thermal expansion coefficient was measured at the heating rate of 10° C./min using the TMA instrument (TMA-Q400 TA instrument).

3. Half Ball Temperature

Temperatures at which the glass frit in powder form contracted to a maximum degree and had a Half Ball shape were measured using a high-temperature microscope at the heating rate of 10° C./min 4. Water Resistance The samples were put into a constant-temperature bath containing 90° C. of distilled water, and while the samples were put into the constant-temperature bath for 48 hours, a change in the color and weight of the distilled water was observed. The weight of the distilled water after the immersion of the samples was measured. Then, rates of the increase and decrease of the weight of the distilled water were expressed as ○ indicating less than 1% and x indicating 1% or greater.

5. Reliability in Calcination

The powdered glass frit filled a metallic mold, was press-formed, was calcined while a temperature was increasing up to 600° C. at the heating rate of 10° C./min, and then crystallization was observed (⊙: No crystallization and excellent glossiness, ○: No crystallization and good glossiness, x: Crystallization and no glossiness).

TABLE 2

| | Embodiment | | | | | Comparative example | |
|---|---|---|---|---|---|---|---|
| | 1 | 2 | 3 | 4 | 5 | 1 | 2 |
| Glass transition temperature (° C.) | 274 | 271 | 269 | 268.3 | 273.1 | 263 | 262 |
| Thermal expansion coefficient (CTE ($\times 10^{-7}$/° C.)) | 131.1 | 135.5 | 82.9 | 82 | 81.4 | 120 | 122 |
| Half Ball temperature (° C.) | 320 | 310 | 325 | 310 | 300 | 420 | 405 |
| Evaluated water resistance | ○ | ○ | ⊙ | ○ | ⊙ | X | X |
| Evaluated reliability in calcination | ○ | ○ | ⊙ | ⊙ | ⊙ | X | X |

Table 2 above shows that the half ball temperature in the embodiment according to the disclosure was 340° C. or less. Accordingly, the glass frit in the embodiment may be calcined at low temperature. Additionally, a thermal expansion coefficient of the glass frit in the embodiment ranged from 70 to 140. Accordingly, the thermal expansion coefficient of the glass frit in the embodiment matched a thermal expansion coefficient of a tempered-glass base material. Further, the glass frit in the embodiment may ensure excellent water resistance and reliability in a calcination process.

In the comparative examples, the glass frit included an $Ag_2O$—$V_2O_5$—$TeO_2$ composition system. The glass frit in the comparative examples had a high softening point and show poor sealing performance unlike the glass frit in the embodiment. Thus, the glass frit in the comparative examples may not ensure the water resistance and the reliability in a calcination process.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

What is claimed is:

1. A glass frit, comprising:
   15-35 wt % of vanadium oxide ($V_2O_5$);
   30-50 wt % of tellurium dioxide ($TeO_2$);
   1-5 wt % of copper oxide (CuO);
   1-5 wt % of barium oxide (BaO);
   10-30 wt % of one or more of silver oxide ($Ag_2O$) and bismuth oxide ($Bi_2O_3$);
   1-10 wt % of zinc oxide (ZnO); and
   5-30 wt % of one or more of tin dioxide (SnO) and molybdenum trioxide ($MoO_3$).

2. The glass frit of claim 1, wherein $V_2O_5$ content and $TeO_2$ content satisfy a relationship equation below:

$$V_2O_5(\text{wt \%})/TeO_2(\text{wt \%}) \leq 1.$$

3. The glass frit of claim 1, wherein 2-7 wt % of the ZnO is included.

4. The glass frit of claim 1, further comprising an inorganic filler.

5. The glass frit of claim 1, wherein a thermal expansion coefficient (CTE) of the glass frit after calcination ranges from $70\times10^{-7}/°$ C. to $140\times10^{-7}/°$ C.

6. A glass frit paste, comprising:
100 wt % of the glass frit according to claim 1; and
an organic vehicle 10-100 wt %.

7. A glass frit paste, comprising:
100 wt % of the glass frit according to claim 2; and
an organic vehicle 10-100 wt %.

8. A glass frit paste, comprising:
100 wt % of the glass frit according to claim 3; and
an organic vehicle 10-100 wt %.

9. A glass frit paste, comprising:
100 wt % of the glass frit according to claim 4; and
an organic vehicle 10-100 wt %.

10. A glass frit paste, comprising:
100 wt % of the glass frit according to claim 5; and
an organic vehicle 10-100 wt %.

11. A vacuum glass assembly, comprising:
a first glass base material;
a second glass base material spaced from the first glass base material and to face the first glass base material; and
a sealing material arranged along an edge of the first glass base material or the second glass base material, to bond the first glass base material and the second glass base material and to seal a space between the first glass base material and the second glass base material,
wherein the sealing material is formed by application and calcination of the glass frit paste of claim 6.

12. A vacuum glass assembly, comprising:
a first glass base material;
a second glass base material spaced from the first glass base material and to face the first glass base material; and
a sealing material arranged along an edge of the first glass base material or the second glass base material, to bond the first glass base material and the second glass base material and to seal a space between the first glass base material and the second glass base material,
wherein the sealing material is formed by application and calcination of the glass frit paste of claim 7.

13. A vacuum glass assembly, comprising:
a first glass base material;
a second glass base material spaced from the first glass base material and to face the first glass base material; and
a sealing material arranged along an edge of the first glass base material or the second glass base material, to bond the first glass base material and the second glass base material and to seal a space between the first glass base material and the second glass base material,
wherein the sealing material is formed by application and calcination of the glass frit paste of claim 8.

14. A vacuum glass assembly, comprising:
a first glass base material;
a second glass base material spaced from the first glass base material and to face the first glass base material; and
a sealing material arranged along an edge of the first glass base material or the second glass base material, to bond the first glass base material and the second glass base material and to seal a space between the first glass base material and the second glass base material,
wherein the sealing material is formed by application and calcination of the glass frit paste of claim 9.

15. A vacuum glass assembly, comprising:
a first glass base material;
a second glass base material spaced from the first glass base material and to face the first glass base material; and
a sealing material arranged along an edge of the first glass base material or the second glass base material, to bond the first glass base material and the second glass base material and to seal a space between the first glass base material and the second glass base material,
wherein the sealing material is formed by application and calcination of the glass frit paste of claim 10.

16. The vacuum glass assembly of claim 11, wherein the calcination of the glass frit paste is performed at a temperature of less than 350° C.

17. The glass frit of claim 4, wherein 5-30 wt % of the inorganic filler is included.

18. The glass frit of claim 4, wherein the inorganic filler comprises one or more of zirconium phosphate, zirconium phosphate tungstate, zirconium, $Li_2O$—$Al_2O_3$—$SiO_2$, β-eucryptite, and zirconium tungstate.

19. The glass frit paste of claim 6, wherein the organic vehicle comprises an organic solvent and an organic binder.

* * * * *